United States Patent
Tammana

(10) Patent No.: US 8,495,619 B2
(45) Date of Patent: Jul. 23, 2013

(54) METHOD AND SYSTEM FOR PRE-DEPLOYMENT CONFLICT CHECKING

(75) Inventor: Rajesh Tammana, Schaumburg, IL (US)

(73) Assignee: Flexera Software LLC, Schaumburg, IL (US)

( * ) Notice: Subject to any disclaimer, the term of this patent is extended or adjusted under 35 U.S.C. 154(b) by 1442 days.

(21) Appl. No.: 11/169,543

(22) Filed: Jun. 29, 2005

(65) Prior Publication Data
US 2007/0006217 A1 Jan. 4, 2007

(51) Int. Cl.
*G06F 9/445* (2006.01)
*G06F 9/44* (2006.01)

(52) U.S. Cl.
USPC ............ 717/174; 717/120; 717/168; 717/178

(58) Field of Classification Search
None
See application file for complete search history.

(56) References Cited

U.S. PATENT DOCUMENTS

| | | | |
|---|---|---|---|
| 6,725,452 B1 * | 4/2004 | Te'eni et al. | 717/168 |
| 7,451,435 B2 * | 11/2008 | Hunt et al. | 717/120 |
| 7,721,284 B2 * | 5/2010 | Bykov et al. | 717/178 |
| 8,082,543 B2 * | 12/2011 | Ford | 717/168 |
| 2003/0005426 A1 * | 1/2003 | Scholtens et al. | 717/169 |
| 2003/0154472 A1 * | 8/2003 | Daase et al. | 717/176 |
| 2004/0003390 A1 * | 1/2004 | Canter et al. | 717/178 |
| 2005/0022176 A1 * | 1/2005 | Ramachandran et al. | 717/170 |
| 2005/0102666 A1 * | 5/2005 | Barta et al. | 717/174 |
| 2005/0144619 A1 * | 6/2005 | Newman | 717/177 |
| 2006/0070061 A1 * | 3/2006 | Cox et al. | 717/174 |
| 2006/0143601 A1 * | 6/2006 | Concha et al. | 717/170 |
| 2006/0174243 A1 * | 8/2006 | Brewer et al. | 717/174 |
| 2006/0265706 A1 * | 11/2006 | Isaacson et al. | 717/174 |
| 2007/0006222 A1 * | 1/2007 | Maier et al. | 717/174 |
| 2007/0168956 A1 * | 7/2007 | Moore et al. | 717/120 |
| 2008/0022274 A1 * | 1/2008 | Shieh | 717/174 |

OTHER PUBLICATIONS

Wise Package Studio 5.6 Feature Grid; http://www.wise.com/library/wps5_featuregrid.pdf; Jul. 14, 2005.
Wise Package Studio http://www.wise.com/wps_quickstart.asp; Jul. 14, 2005.
Wise Package Studio; http://www.wise.com/wps_features.asp; Jul. 14, 2005.

\* cited by examiner

*Primary Examiner* — Thuy Dao
(74) *Attorney, Agent, or Firm* — Michael A. Glenn; Glenn Patent Group

(57) ABSTRACT

A method and system for pre-deployment conflict checking are disclosed. In one embodiment, the method comprises receiving a software package from a computer source. A test package is created based on the received software package. The created test package is provided to a computer machine. The test package identifies a conflict between the software package and an application on the computer machine without installing a resource on the computer machine.

15 Claims, 7 Drawing Sheets

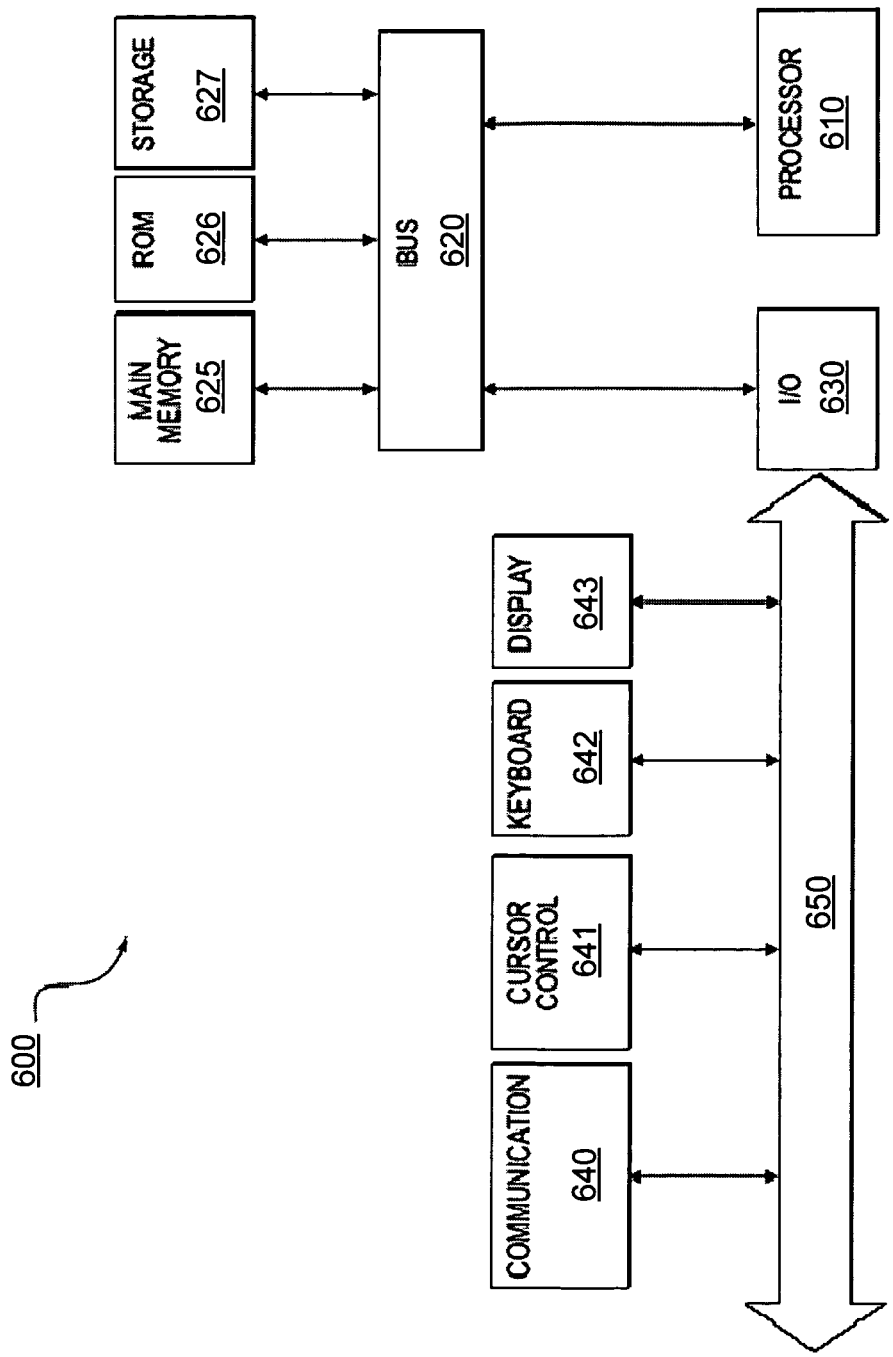

METHOD AND SYSTEM FOR PRE-DEPLOYMENT CONFLICT CHECKING

FIELD OF THE INVENTION

The field of the invention relates generally to computer systems and more particularly relates to a method and system for pre-deployment conflict checking of software packages.

BACKGROUND OF THE INVENTION

Generally, in an enterprise environment, an administrator employs a distribution system 110 to deploy a software package to one or more computer machines. However, deploying a software package to a computer machine without testing can have unintended consequences. For example, an administrator distributing a software package to a computer machine runs the risk that an application or patch may conflict with other installed applications on the computer machine.

Some of the possible consequences of a software package conflicting with an existing application include: leaving resources behind during un-installation, removing resources used by another installed application, and disabling another installed application. For example, Application A to be installed on a machine may share a common file with Application B already existing on the machine. Subsequent to installing Application A on the machine, if Application B is uninstalled, the common file may be removed from the machine, thus breaking Application A. Similarly, if Application A is uninstalled, the common file may be removed from the machine, thus breaking Application B. The resulting conflicts can cause serious damages by crashing mission-critical applications, reducing employee productivity, and increasing information technology costs.

In the past, to minimize software conflicts, an administrator may install a software package on a given computer machine to identify any conflict between the software package and an existing application on the computer machine. However, such an approach effectively installs the software package on the computer machine such that if a conflict actually occurs, additional time and effort are spent to correct the problem. In addition, different machines have different installed applications and software dependencies. For example, software configuration on a given machine may change over time, and an end-user may install other non-enterprise software on his or her machine. Thus, identifying a potential conflict on a given machine does not mean that other machines having the same applications will be subject to the same conflict. Similarly, the fact that a conflict does not result from installing a software package on a given machine does not mean that installing the software package on other machines having the same applications will not result in a conflict.

Alternatively, an administrator may test an application's various functions before deployment and attempt to fix the potential problems. This manual conflict checking process adds additional time and effort to application deployment. These problems make it difficult to test and deploy software packages efficiently.

SUMMARY

A method and system for pre-deployment conflict checking are disclosed. In one embodiment, the method comprises receiving a software package from a computer source. A test package is created based on the received software package. The created test package is provided to a computer machine. The test package identifies a conflict between the software package and an application on the computer machine without installing a resource on the computer machine.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

FIG. 6 illustrates an exemplary computer architecture for use with the present system, according to one embodiment of the invention.

DETAILED DESCRIPTION

Figure 1:
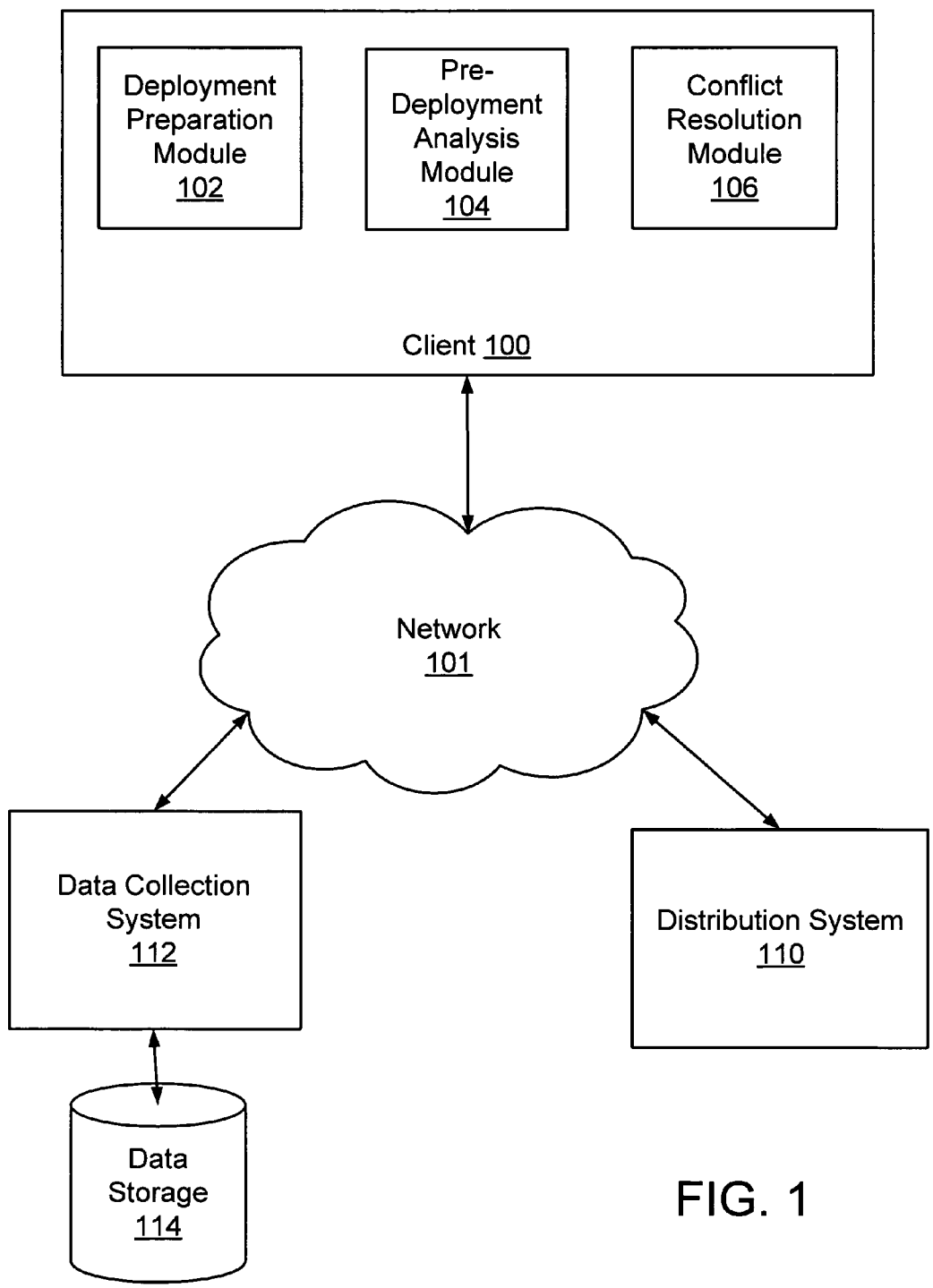
FIGS. 1-4 illustrate block diagrams of an exemplary software distribution system, according to an embodiment of the present invention.

A method and system for pre-deployment conflict checking are disclosed. In one embodiment, the method comprises receiving a software package from a computer source. A test package is created based on the received software package. The created test package is provided to a computer machine. The test package identifies a conflict between the software package and an application on the computer machine without installing a resource on the computer machine.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

As used herein, the following terms shall have the following meanings without regard to its upper or lower case usage.

"Computer source" means a location on a computer or network from which a software package may be received.

"Conflict resolution module" refers to any combination of software, firmware, and/or hardware that attempts to resolve a reported conflict.

"Data collection system" refers to a system that receives a test result from a test package, stores the test result in a data storage, and/or sends the test result to a pre-deployment analysis module.

"Data storage" refers to a system that stores a test result. For example, a data storage may be a structured query language ("SQL") database.

"Deployment preparation module" refers to any combination of software, firmware, and/or hardware that receives a software package from a computer source and generates a test package based on the received software package.

"Distribution system" refers to a system that deploys a test package to a target machine. A distribution system may be any system used to deploy software or software packages to one or more target machines.

"Pre-deployment analysis module" refers to any combination of software, firmware, and/or hardware that receives test results from a data collection system for analysis by an administrator.

"Resource" means a file, registry entry, component, or other data of a software application.

"Software package" refers to a package of software applications to be installed on a target machine.

"Test package" refers to a package including substantially the same content as a software package, except that the test package excludes installation code but includes code for performing conflict testing. A test package also reports a test result to a data collection system.

FIGS. 1-4 illustrate block diagrams of an exemplary software distribution system, according to embodiments of the present invention. In addition to software distribution systems, it is to be appreciated that other systems employing the various teachings herein may also be used to practice the various aspects of the present invention, and as such, are considered to be within its full scope.

In FIG. 1, a network diagram shows that a client 100 is coupled to a network 101. The client 100 is utilized by an administrator to test the deployment of a software package to a target machine. As shown, the client 100 includes a deployment preparation module 102, a pre-deployment analysis module 104, and a conflict resolution module 106. The deployment preparation module 102, pre-deployment analysis module 104, and conflict resolution module 106 may be firmware and/or hardware modules or any combination of software, firmware, and/or hardware. One of ordinary skill in the art will appreciate that the various modules may be distributed differently than illustrated herein. For example, the various modules may be combined into one or two modules and may be distributed among different clients 100 coupled to the network 101.

The network 101 is also coupled to a distribution system 110 and a data collection system 112. The data collection system 112 is in turn coupled to a data storage 114. The network 101 may be a local area network ("LAN"), wide area network ("WAN"), virtual private network ("VPN"), or other network that is configured to transmit data among the client 100, the distribution system 110, the data collection system 112, and/or machines targeted for installation.

Figure 2:
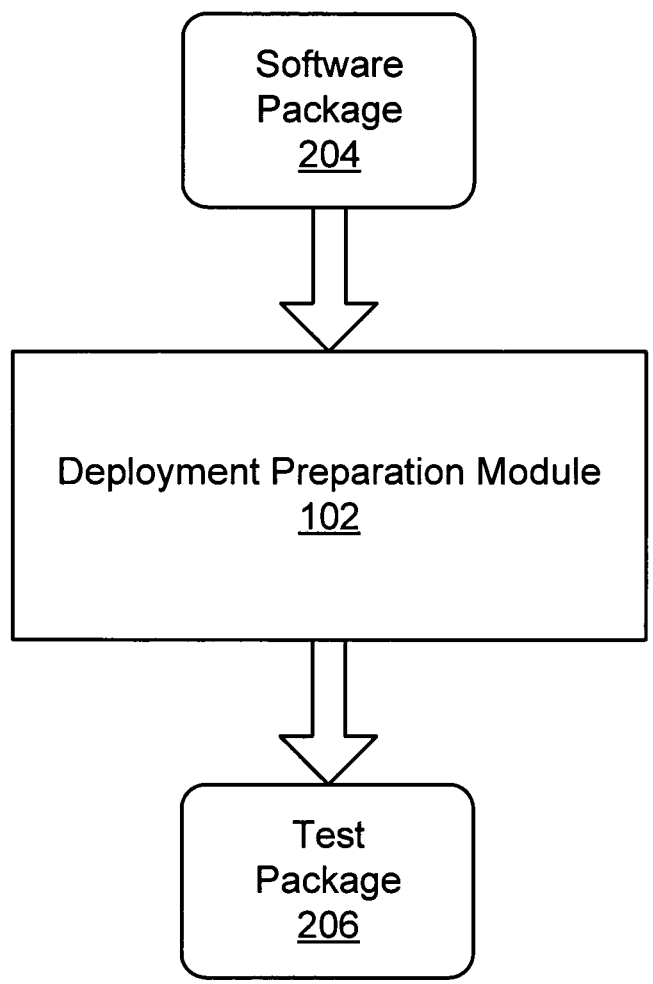

In FIG. 2, the deployment preparation module 102 is configurable to receive a software package 204 as an input from a computer source (e.g., as specified by an administrator). The software package 204 is to be deployed to one or more target machines. The deployment preparation module 102 is configured to create a test package 206 from the software package 204. In particular, the deployment preparation module 102 reads the provided software package 204, makes changes to the software package 204, and creates the test package 206 that may be tested on the target machines.

The contents of the test package 206 are substantially the same as the software package 204, except that the test package 206 does not include installation code but includes software code that performs conflict testing on a target machine. To create the test package 206, the deployment preparation module 102 copies the contents of the software package 204 to the test package 206. The deployment preparation module 102 then modifies the test package 206 to allow the test package 206 to be tested on a target machine. In particular, the deployment preparation module 102 disables software code of the test package 206 that may modify a target machine. Such software code includes code that reboots a target machine, installs files, or modifies registry entries. Accordingly, if deployed to a target machine, the test package 206 does not install resources (e.g., files, registry entries, etc.) on the target machine and does not modify the target machine's existing software configuration. The deployment preparation module 102 also adds software code to the test package 206 that initiates and performs conflict testing on a target machine. The software code added to the test package 206 may also initiate and perform deployment testing on the target machine.

In an embodiment, the administrator can specify the type of test to be performed on the target machine. For example, such software code may test specific conditions of the target machine, such as available disk space, launch conditions, and user privileges. The software code also identifies the software dependencies and potential conflicts between the software package 204 and existing applications (e.g., Windows Installer based software packages) on the target machine. The software code can further gather the test results and return the results to a data collection system. The deployment preparation module 102 is also configured to remove contents that are unnecessary for conflict testing (and/or deployment testing) to reduce the size of the test package 206.

In an embodiment of the invention, the deployment preparation module 102 updates the product code of the test package 206 and saves the original product code in a different, new property. This avoids the test package 206 from triggering an upgrade if the software package 204 is an upgrade to a product. The deployment preparation module 102 may also add some other properties to the test package 206, such as the network address of the data collection system, a test descriptive identifier, tests to run. These properties are added based on the administrator's input and are used by the test package 206 to execute tests and report test results.

Figure 3:
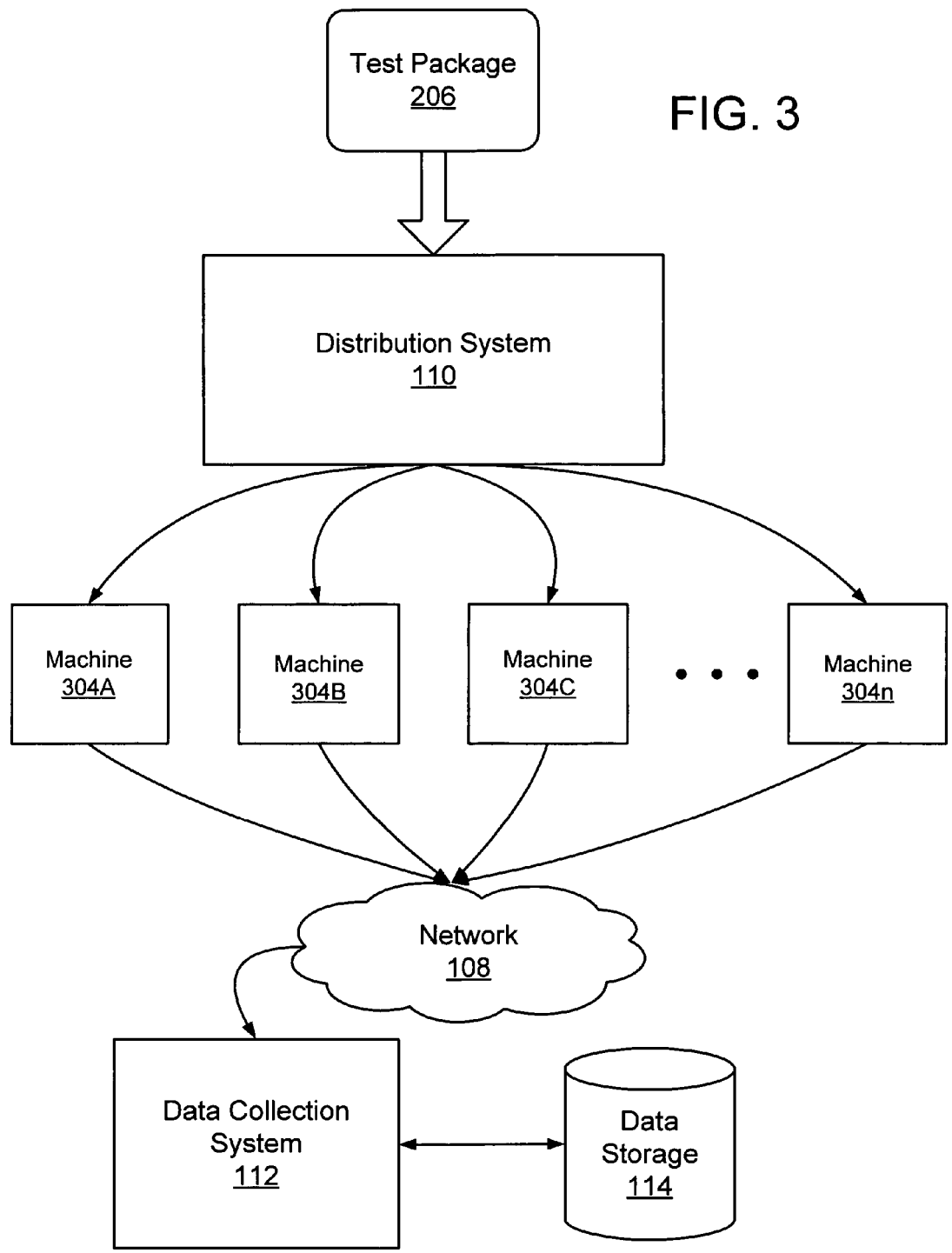

In FIG. 3, an administrator provides the test package 206 to a distribution system 110. The distribution system 110 deploys the test package 206 to one or more target machines 304 as if the test package 206 is a regular software package. It is to be appreciated that the distribution system 110 may be any system used to deploy software or software packages to one or more target machines. In an embodiment of the invention, an administrator may use the deployment preparation module 102 to create different groups of packages representing different sets of target machines. This avoids performing conflict checking between products that do not coexist on a target machine. For example, the administrator can create groups representing different divisions in an organization that receive software packages. Thus, the target machines 304 may represent machines within a group on which the test package 206 is to be tested.

In response to deploying the test package 206 to the target machines 304, each target machine 304 executes the deployed test package 206. The test package 206 launches setup actions and performs conflict testing on the target machines 304. For conflicting testing, the test package 206 identifies software dependencies and determines if any software already installed on a target machine 304 conflicts with the test package 206 (and hence the software package 204). Some of the exemplary conflict tests that the test package 206 performs are listed in Table 1.

TABLE 1

Exemplary Conflict Tests
Conflict Tests

Do components with the same component code have identical destinations?
Do components with identical component codes contain identical files?
Do components with no key path have appropriately set information?
Does each component contain at most one executable ("EXE"), dynamic link library ("DLL"), object linking and embedding control extension ("OCX"), type library ("TLB"), system configuration ("SYS"), device driver ("DRV"), compiled hypertext markup language help format ("CHM"), or help ("HLP") file?
Is each EXE, DLL, OCX, CHM, or HLP file its component's key path?
Is the same file not contained in two different components?
Does the same file in different components have identical version information in each component?

TABLE 1-continued

Exemplary Conflict Tests
Conflict Tests

Do merge modules with identical module identifiers have identical version information?
Does a single registry key or value not occur in multiple components?
Can files in an installation package be replaced with merge modules?
Does the same shortcut not appear in multiple components?
Does the same initialization ("INI") data not appear in multiple components?
Does the same open database connectivity ("ODBC") data not appear in multiple components?
Does the same service information not appear in multiple components?
Does the same file-extension and verb information not appear in multiple components?
Is each package's package code unique?
Is each package's product code unique?
Is each package's upgrade code unique?
Is there no conflict between existing INI data and an INI file being installed?
Do file name/target directory pairs in components not exist as IniFile entries?
Do files with the same name and destination directory have the same size, version, and language if validating a package against an operating system snapshot?
Do registry entries with the same root key, key name, and value name have the same data type and value if validating a package against an operating system snapshot?

The test package 206 may also perform deployment testing on the target machines 304. For example, the test package 206 evaluates the disk costing and identifies those target machines 304 that do not meet the disk space requirement. The test package 206 may also cycle through the files and registry entries of the target machines 304 and query the target machines 304 for permissions to access, create, and/or update the files or registry entries.

In response to performing conflict testing (and/or deployment testing) on the target machines 304, the test package 206 reports the test results to a data collection system 112 directly or via the network 101. In an embodiment of the invention, the data collection system 112 is a web service that receives the test results via the Internet. The data collection system 112 then stores the test results in the data storage 114 (e.g., a SQL database).

Figure 4:
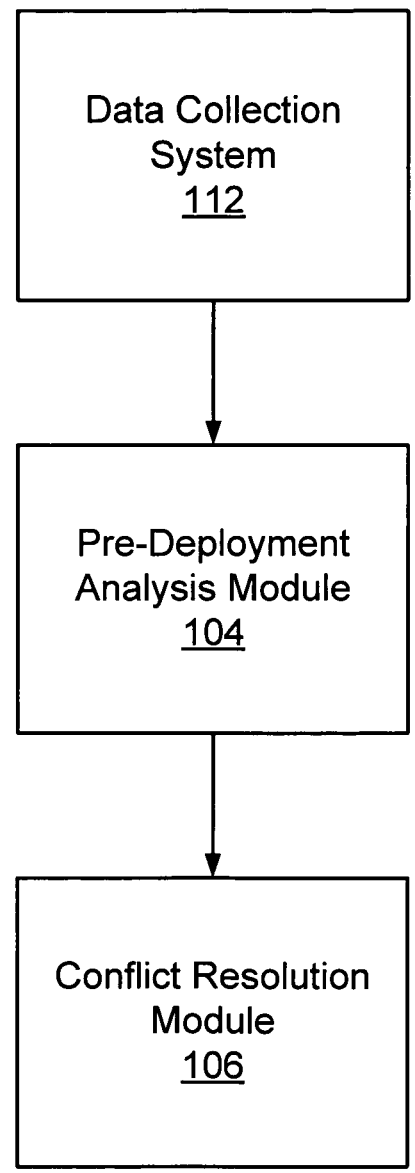

In FIG. 4, an administrator can use the pre-deployment analysis module 104 to access the data collection system 112 (e.g., via a network such as the Internet). Via the data collection system 112, the pre-deployment analysis module 104 can access the test results stored in the data storage 114. Specifically, the data collection system 112 obtains the test results from the data storage 114 and returns the test results to the pre-deployment analysis module such that the administrator can view the test results using the pre-deployment analysis module 104. If a conflict exits between an existing application on a target machine 304 and the test package 206 (and hence the software package 204), the administrator can manually resolve the conflict by, for example, making appropriate changes to the software package 204 and/or the target machine 304.

In an embodiment of the invention, the pre-deployment analysis module 104 reports the test results to the conflict resolution module 106. The conflict resolution module 106 is configured to resolve a conflict, if any, between the software package 204 and an existing application on a target machine 304. Specifically, the conflict resolution module 106 makes changes to the software package 204 and/or the target machine 304 such that the software package 204 will not cause a conflict if deployed to the target machine 304. Accordingly, a conflict between the software package 204 and an existing application can be corrected without installing a resource on a target machine 304. Table 2 lists some exemplary conflicts and possible conflict resolutions performed by the conflict resolution module 106.

TABLE 2

Exemplary Conflict Resolutions

| Description of Conflict | Resolution |
| --- | --- |
| Components with the same component code have different destinations. | Destination of the component is changed to the destination stored in a conflict database. This avoids destination files of two different components having the same component code from being removed if one component is uninstalled. |
| Component with no key path is missing information in a create folder table. | A create folder entry is created for the component. |
| Component contains more than one portable executable file or help file. | Modify component to contain one executable or help file; create new components if needed. |
| Component's executable is not its key file. | Executable is marked as the component's key file. |
| The same file is located in more than one component. | The software package's component code is changed to match the code in a conflict database. |
| The same ODBC information appears in more than one component. | The software package's ODBC component code is changed to match the code in a conflict database. |
| The software package's package code value matches that of another software package. | A new, unique package code value is automatically generated. |
| The software package's product code value matches that of another software package. | A new, unique product code value is automatically generated. |
| The software package's upgrade code value matches that of another software package. | A new, unique upgrade code value is automatically generated. |

Figure 5A:
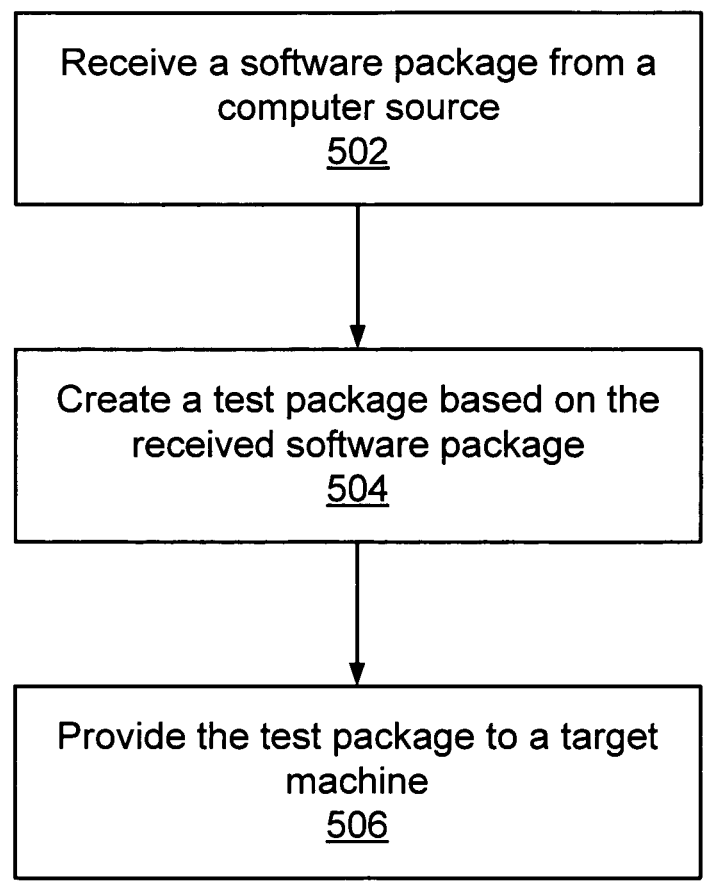
FIGS. 5A and 5B illustrate flow diagrams of an exemplary process of pre-deployment conflict checking, according to an embodiment of the present invention.
Figure 5B:
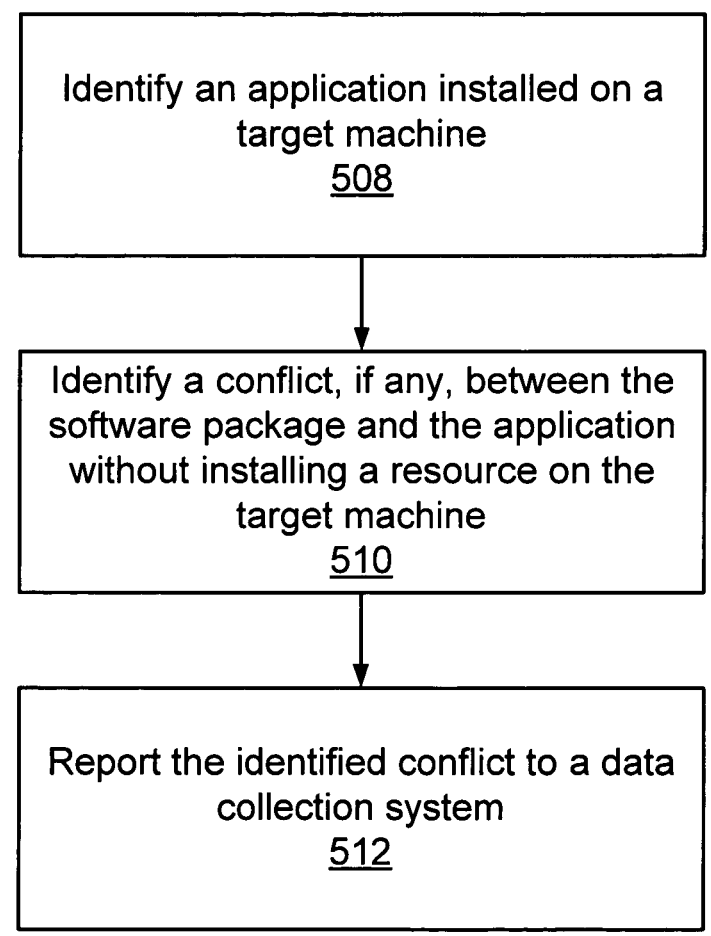

FIGS. 5A and 5B illustrate flow diagrams of an exemplary process of pre-deployment conflict checking, according to an embodiment of the present invention. In FIG. 5A, a deployment preparation module 102 receives a software package 204 from a computer source. (502) The deployment preparation module 102 creates a test package 206 based on the received software package 204. (504) Particularly, the deployment preparation module 102 removes installation code from the software package 204 and adds conflict checking code to the software package 204 to create the test package 206. The test package 206 is then provided to a target machine 304. (506) In an embodiment of the invention, a distribution system 110 distributes the test package 206 to a plurality of target machines 304.

In FIG. 5B, a test package 206 deployed to a target machine 304 identifies an application installed on the target machine 304. (508) The test package 206 also identifies a conflict, if any, between the software package 204 and the application without installing a resource on the target machine. (510) Specifically, the test package 206 is configured to identify software dependencies between the software package 204 and the application to determine if installing or uninstalling the software package 204 will impact the application, and vice versa. The software package 206 is configured to report an identified conflict to a data collection system 112. (512) The test package 206 repeats the same steps for other applications installed on the target machine 304.

FIG. 6 illustrates an exemplary computer architecture for use with the present system, according to one embodiment of the invention. Computer architecture 600 can be used to implement the client 100, the distribution system 110, the machines 304, and/or the data collection system 112. One embodiment of architecture 600 comprises a system bus 620 for communicating information, and a processor 610 coupled to bus 620 for processing information. Architecture 600 further comprises a random access memory (RAM) or other dynamic storage device 625 (referred to herein as main memory), coupled to bus 620 for storing information and instructions to be executed by processor 610. Main memory 625 also may be used for storing temporary variables or other intermediate information during execution of instructions by processor 610. Architecture 600 also may include a read only memory (ROM) and/or other static storage device 626 coupled to bus 620 for storing static information and instructions used by processor 610.

A data storage device 627 such as a magnetic disk or optical disc and its corresponding drive may also be coupled to computer system 600 for storing information and instructions. Architecture 600 can also be coupled to a second I/O bus 650 via an I/O interface 630. A plurality of I/O devices may be coupled to I/O bus 650, including a display device 643, an input device (e.g., an alphanumeric input device 642 and/or a cursor control device 641). For example, web pages and business related information may be presented to the user on the display device 643.

The communication device 640 is for accessing other computers (servers or clients) via a network. The communication device 640 may comprise a modem, a network interface card, a wireless network interface or other well known interface device, such as those used for coupling to Ethernet, token ring, or other types of networks.

Although the present method and system have been described with respect to a software distribution system, one of ordinary skill would understand that the techniques described may be used in any situation where it is to determine if a software package conflicts with an existing application on a computer machine. For example, the test package of the present invention may be directly installed to a target machine without utilizing a distribution system.

A method and system for pre-deployment conflict checking have been disclosed. Although the present methods and systems have been described with respect to specific examples and subsystems, it will be apparent to those of ordinary skill in the art that it is not limited to these specific examples or subsystems but extends to other embodiments as well.

I claim:

1. A computer-implemented method, comprising:
   receiving a software package at a pre-deployment computer machine, the software package including software to be installed on a computer machine different from the pre-deployment computer machine;
   creating a test package by removing installation code and adding conflict testing code into the received software package;
   providing the created test package to the pre-deployment computer machine, the created test package executing the conflict testing code on the pre-deployment computer machine and identifying conflicts between the software package and an application currently installed on the pre-deployment computer machine;
   receiving information regarding the conflicts from the created test package at the pre-deployment computer machine;

resolving, at the pre-deployment computer machine, the conflicts by modifying the software package to produce a modified software package and without installing a resource on the computer machine; and providing the modified software package to the computer machine for installation of the software on the computer machine.

2. The computer-implemented method of claim 1, wherein providing the test package to the pre-deployment computer machine comprises:

providing the test package to a plurality of pre-deployment computer machines via a distribution system.

3. The computer-implemented method of claim 1, wherein the test package is configured to identify a software dependency between the application and the solftware package.

4. The computer implemented method of claim 1, wherein creating the test package comprises:

removing installation code from the software package; and
adding software code that performs conflict testing to the software package.

5. The computer implemented method of claim 1, wherein the test package is configured to report the conflicts to a web service via a network, the web service being configured to store information regarding the conflicts in a data storage and inform an administrator of the conflict.

6. A non-transitory computer-readable medium having stored thereon a plurality of instructions, said plurality of instructions when executed by a computer, cause said computer to perform:

receiving a software package at a pre-deployment computer machine, the software package including software to be installed on a computer machine different from the pre-deployment computer machine;

creating a test package by removing installation code and adding conflict testing code into the received software package;

providing the created test package to the pre-deployment computer machine, the created test package executing the conflict testing code on the pre-deployment computer machine and identifying conflicts between the software package and an application currently installed on the pre-deployment computer machine;

receiving information regarding the conflicts from the created test package at the pre-deployment computer machine;

resolving, at the pre-deployment computer machine, the conflict by modifying the software package to produce a modified software package and without installing a resource on the computer machine; and providing the modified software package to the computer machine for installation of the software on the computer machine.

7. The non-transitory computer-readable medium of claim 6, wherein the test package is provided to a plurality of pre-deployment computer machines via a distribution system.

8. The non-transitory computer-readable medium of claim 6, wherein the test package is configured to identify a software dependency between the application and the software package.

9. The non-transitory computer-readable medium of claim 6, wherein the plurality of instructions cause the computer to create the test package by:

removing installation code from the software package; and
adding software code that performs conflict testing to the software package.

10. The non-transitory computer-readable medium of claim 6, wherein the test package is configured to report the conflicts to a web service via a network, the web service being configured to store information regarding the conflicts in a data storage and inform an administrator of the conflict.

11. A computer system, comprising:

a processor; and
memory coupled to the processor, the memory storing instructions;
wherein the instructions when executed by the processor cause the processor to,
receive a software package at a pre-deployment computer machine, the software package including software to be installed on a computer machine different from the pre-deployment computer machine;
create a test package by removing installation code and adding conflict testing code into the received software package;
provide the created test package to the pre-deployment computer machine, the created test package executing the conflict testing code on the pre-deployment computer machine and identifying conflicts between the software package and an application currently installed on the pre-deployment computer machine;
receive information regarding the conflicts from the created test package at the pre-deployment computer machine;
resolve, at the pre-deployment computer machine, the conflict by modifying the software package to produce a modified software package and without installing a resource on the computer machine; and
providing the modified software package to the computer machine for installation of the software on the computer machine.

12. The computer system of claim 11, wherein the test package is provided to a plurality of pre-deployment computer machines via a distribution system.

13. The computer system of claim 11, wherein the test package is configured to identify a software dependency between the application and the software package.

14. The computer system of claim 11, wherein the instructions cause the processor to create the test package by:

removing installation code from the software package; and
adding software code that performs conflict testing to the software package.

15. The computer system of claim 11, wherein the test package is configured to report the conflicts to a web service via a network, the web service being configured to store information regarding the conflicts in a data storage and inform an administrator of the conflict.

* * * * *